United States Patent [19]

Willcocks et al.

[11] Patent Number: 4,604,061

[45] Date of Patent: Aug. 5, 1986

[54] DISPLAY RACK AND COLOR SELECTION ASSEMBLY

[76] Inventors: Reginald Willcocks, 1 Joel Place, Port Washington, N.Y. 11050; Marvin Zaro, 405 E. 63rd St., New York, N.Y. 10021

[21] Appl. No.: 719,826

[22] Filed: Apr. 4, 1985

[51] Int. Cl.⁴ ............................................. G09B 25/04
[52] U.S. Cl. ...................................... 434/74; 211/45; 434/78
[58] Field of Search .......................... 211/45, 55, 128; 434/72, 74, 75, 76, 77, 78, 79, 98, 99, 398, 404; 312/234

[56] References Cited

U.S. PATENT DOCUMENTS

| D. 162,990 | 4/1951 | Roeder | 211/128 X |
|---|---|---|---|
| 1,111,320 | 9/1914 | Pearson | 434/75 |
| 1,269,024 | 6/1918 | Wastie | 434/79 |
| 1,832,750 | 11/1931 | Stephens | 434/78 |
| 1,929,335 | 10/1933 | Steadman | 434/79 |
| 2,169,721 | 8/1939 | Cederquist | 211/128 |
| 2,190,675 | 2/1940 | Patterson | 434/74 |
| 2,234,609 | 3/1941 | Rowe | 434/78 |
| 2,753,053 | 7/1956 | Chapin | 211/45 |
| 3,965,583 | 6/1976 | Price | 434/75 |

FOREIGN PATENT DOCUMENTS 317725  1/1957  Switzerland ..................... 211/128

Primary Examiner—Harland S. Skogquist
Attorney, Agent, or Firm—Michael Ebert

[57] ABSTRACT

A display rack and color selector assembly adapted to present to a homeowner a group of sample boards carrying actual roof shingles in a variety of colors and to afford a visual picture of a typical home whose architectural style is similar to that of the homeowner, the roof of the pictured home being selectively covered by a shingled surface in any one of the sample colors. The color selector includes a front panel on whose face is a radial array of pictures of typical homes in different architectural style, the roof in each picture being notched out to define a window whose geometry matches that of the roof. Mounted behind the panel is a rotatable color wheel which is divided into segments each having a shingled surface whose color corresponds to that of a respective sample in the group. The homeowner, while inspecting a pictured home on the panel face which is similar in style to that of his own, can then turn the color wheel to dial the segments thereof into registration with the roof window and thereby see how the pictured home looks when its roof is covered with shingles in any one of the sample colors. In this way the homeowner can decide which of these colored shingles is suitable to replace the worn shingles on the roof of his home.

9 Claims, 7 Drawing Figures

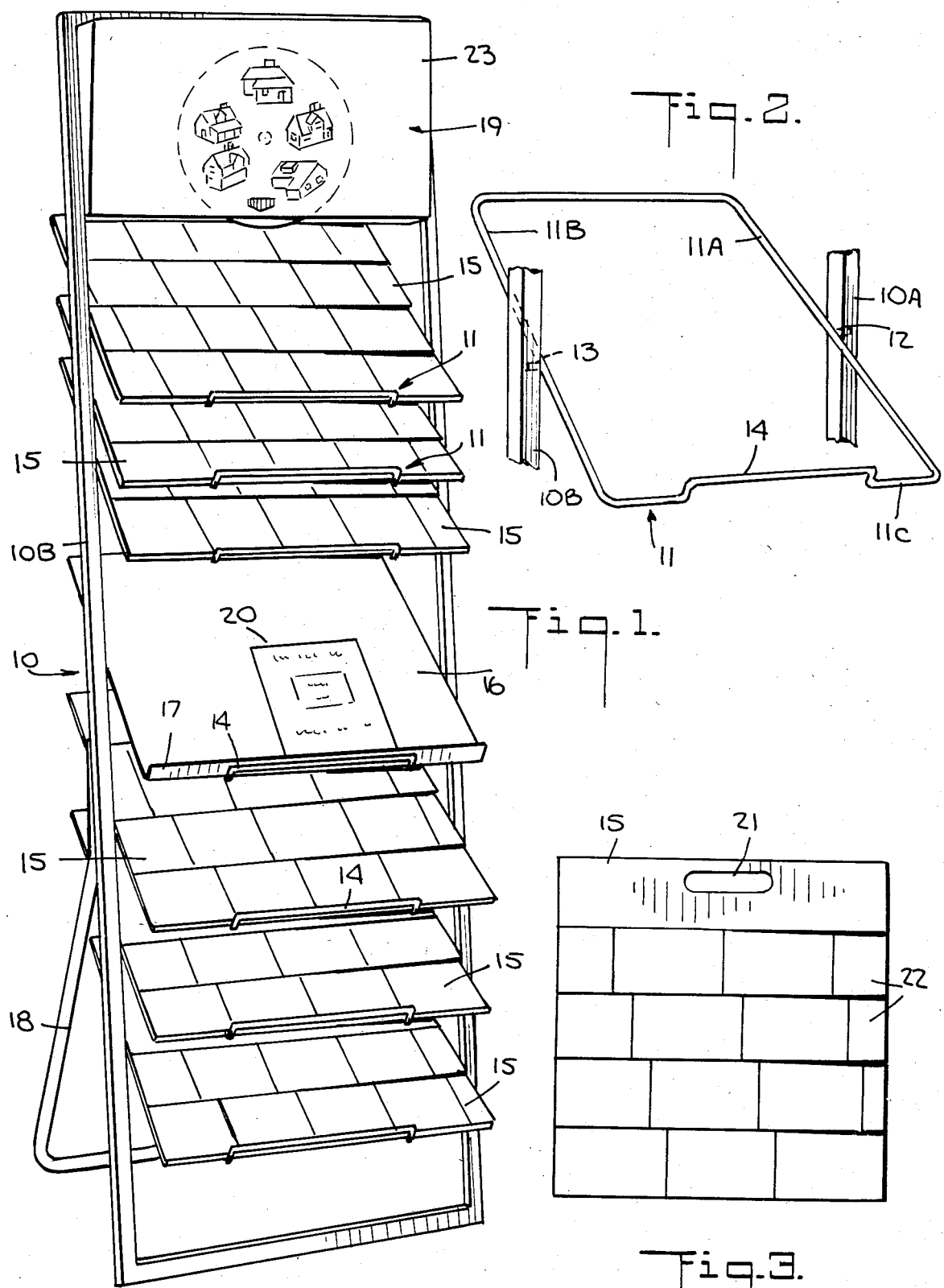

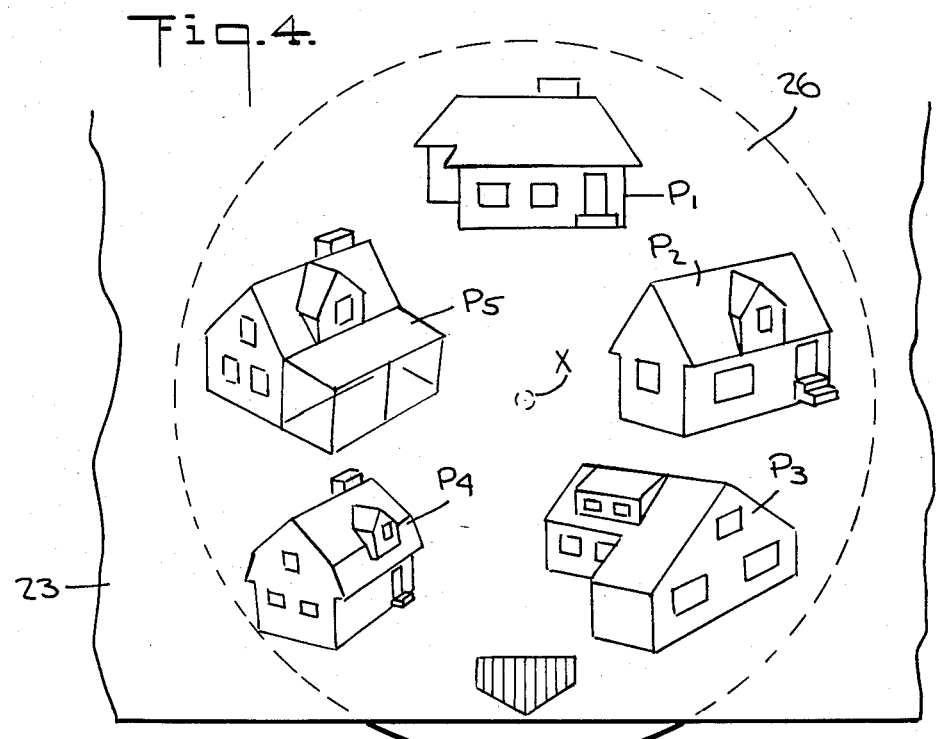
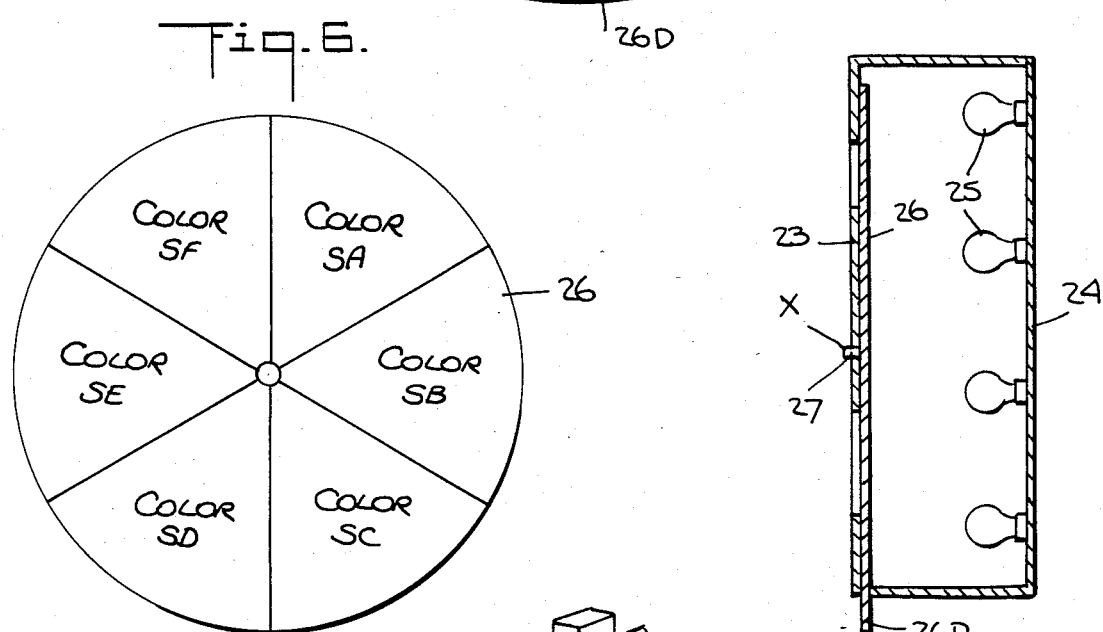
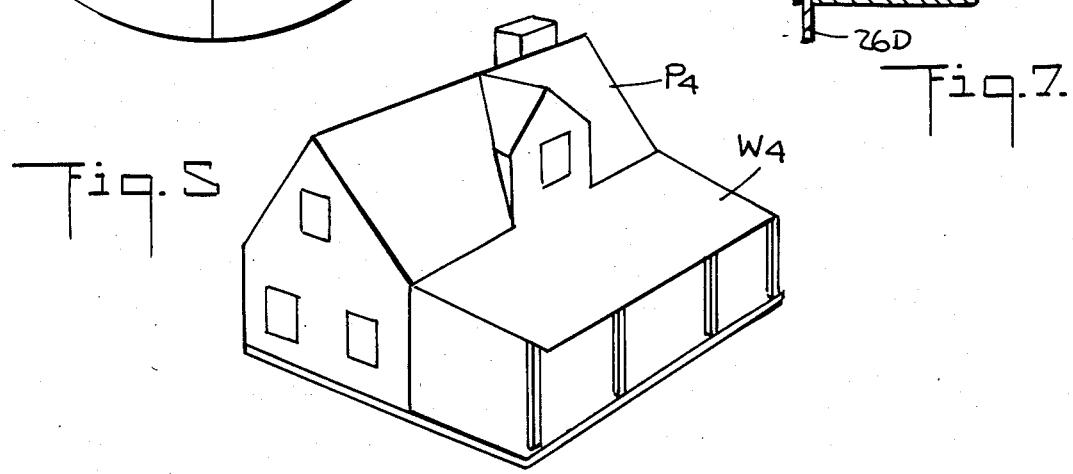

DISPLAY RACK AND COLOR SELECTION ASSEMBLY

BACKGROUND OF INVENTION

1. Field of Invention:

This invention relates generally to merchandise display racks, and more particularly to a display rack and a color selector assembly adapted to present to a homeowner a group of sample boards showing actual roof shingles in a variety of colors, and to afford a visual picture of a typical home whose architectural style is similar to that of the owner, the roof of the pictured home being selectively covered by a shingled surface in any one of the sample colors to assist the homeowner in making a proper choice to replace the worn shingles on the roof of his residence.

2. Status of Prior Art:

Most residential homes have a roof covered by shingles. A shingle is a small piece of building material, usually of rectangular shape with one end thicker than the other, the shingles being placed in overlapping rows to create a roof covering.

When shingles are exposed to the elements for a prolonged period, they tend to curl, crack, oxidize and rot, particularly in the case of wood shingles. Hence most shingled roofs have a limited life and require replacement after a few years of wear. In recent years, shingles have been developed that are water and rot-proof and therefore have a longer effective life. Thus a shingle is now commercially available in the form of a layer of waterproof asphalt having ceramic-coated granules dispersed therein, the asphalt layer being laminated to a fiberglass base. But regardless of the type of shingles covering the roof, it is still necessary to replace the shingles after many years of wear, particularly in a rigorous climate.

Shingles which are now available come in a variety of decorative colors, often in the form of color blends that simulate the appearance of natural materials. These shingles come in redwood and cedar blends, as well as in blends which impart a slate-like or weathered wood appearance thereto.

When therefore a homeowner finds it necessary to reshingle the roof of his home, he must decide on a color which reflects his taste, yet does not violate the architectural style of his home. For example, a shingle having a color blend simulating weathered wood may be appropriate to a home in a rustic or Cape Cod style, but is altogether out of place on the roof of a more formal Tudor style residence. Or a shingle whose color is suitable for a home in a contemporary style may be incongruous on the roof of a home in Swiss chalet style.

In most American suburban communities, the homes are in various 19th and 20th century styles and even in 18th century colonial styles. The range of architectural styles and the current availability of color choices in roof shingles makes it difficult for the homeowner to make a sensible selection when the time comes to replace the worn shingles on the roof of his home.

Though a homeowner can visit a building supply showroom or other facility which carries roof shingles in a range of materials and colors, he is not usually able, simply by looking at shingle samples, to determine how these would look when used to cover the roof of his own residence. It is for this reason that the present merchandising practice is for a shingle salesman to call on the homeowner at his residence with a kit containing a large assortment of shingle samples in different colors, so that the homeowner can then inspect these samples in the context of his home's architectural style.

This practice, which entails field trips on the part of salesmen carrying heavy sample cases, is time-consuming, costly, and inefficient. Moreover, even though the homeowner can then place a shingle sample board on his roof to see how it looks in this environment, it gives him no real impression as to the appearance of his roof when fully covered with shingles of a given material and color.

One faces a comparable problem in deciding on the color of paint to be applied to the walls of a room. The visual impression made on a large wall area coated with paint of a given color may be quite different from that obtained merely by placing a small color card against the wall. The phenomenon of color perception is complex and depends not only on the particular color but also on the area covered thereby. Thus a green paint covering a large wall area appears much less intense than the same color paint applied to a small area, for the eye makes a different optical accommodation to the smaller area.

SUMMARY OF INVENTION

In view of the foregoing, the main object of this invention is to provide a display rack and color selector assembly which makes it possible for a homeowner to inspect shingle sample boards in a variety of colors and to see how a roof in a typical home whose architectural style is similar to his own would look when covered with shingles in any one of the sample colors.

A significant advantage of the invention is that such inspection can take place in a showroom or other shingle sales facility. It dispenses with the need for field trips and cumbersome kit carrying cases, for the homeowner can make his roof shingle selection right in the showroom.

More particularly, an object of this invention is to provide an assembly of the above type in which actual shingle samples in different colors are mounted on boards which are supported on the shelves of the rack. The sample boards are removable from the shelves so that the homeowner, having made a provisional selection, can, if he wishes, take the selected sample board to his home to see how it looks on the roof of his home, or consult others as to his choice. This does away with the need for a kit having an assortment of samples to be carried to the home, for the homeowner has already made a provisional choice, and needs only to check his selection at home before placing his order for shingles.

Also an object of the invention is to provide a display rack in which a group of sample boards in different colors are separated from each other on the rack and are so tilted that the homeowner is able to view any one of the boards without having to withdraw it from the rack.

Still another object of the invention is to provide a color selector in which each of the colored roof shingles is in the form of an illuminated film transparency, giving the viewer a realistic impression of a roof covered thereby.

Briefly stated, these objects are attained in a display rack and color selector assembly adapted to present to a homeowner a group of sample boards carrying actual roof shingles in a variety of colors and to afford a visual picture of a typical home whose architectural style is similar to that of the homeowner, the roof of the pictured home being selectively covered by a shingled surface in any one of the sample colors. The color selector includes a front panel on whose face is a radial array of pictures of typical homes in different architectural style, the roof in each picture being notched out to define a window whose geometry matches that of the roof. Mounted behind the panel is a rotatable color wheel which is divided into segments each having a shingled surface whose color corresponds to that of a respective sample in the group. The homeowner, while inspecting a pictured home on the panel face which is similar in style to that of his own, can then turn the color wheel to dial the segments thereof into registration with the roof window and thereby see how the pictured home looks when its roof is covered with shingles in any one of the sample colors. In this way the homeowner can decide which of these colored shingles is suitable to replace the worn shingles on the roof of his home.

OUTLINE OF DRAWING

For a better understanding of the invention as well as other objects and further features thereof, reference is made to the following detailed description to be read in conjunction with the accompanying drawings, wherein:

FIG. 1 is a perspective view of a display rack and color selector assembly in accordance with the invention;

FIG. 2 illustrates one of the rack shelves;

FIG. 3 shows one of the shingle sample boards;

FIG. 4 shows the array of typical homes pictured on the front panel of the color selector;

FIG. 5 shows one of the pictured homes in an enlarged scale and its roof window;

FIG. 6 illustrates the rotatable color wheel included in the selector; and

FIG. 7 is a transverse section taken through the color selector.

DESCRIPTION OF INVENTION

Referring now to FIG. 1 there is shown a display rack and color selector assembly in accordance with the invention, the rack including an upstanding rectangular metal frame 10 provided with a pair of vertical side bars 10A and 10B. These side bars support at different levels seven wire shelves 11 to form a multi-tier rack. In practice the rack may be designed to include a greater or lesser number of shelves depending on the display requirements. Secured to the rear of side bars 11A and 11B are the inclined legs of an easel support 18. Mounted at the upper end of frame 10 between the side bars is a shallow color selector box 19 whose front panel faces the viewer.

As shown in FIG. 2, each shelf 11 is formed from a continuous wire in a generally rectangular form whose parallel sides 11A and 11B are provided at their midpoints with projecting mounting bolts 12 and 13. These bolts extend into holes in the side bars 10A and 10B of the frame and are secured thereto to hold each shelf at a downwardly inclined position. The front end 11C of wire shelf 11 is shaped to define a holding ledge 14 for a board resting on the tilted shelf.

Resting on each shelf is a board whose dimensions match those of the shelf. In the rack shown in FIG. 1, the lower three and the upper three of the seven shelves 11 have roof shingle sample boards 15 received thereon, whereas the middle shelf 11 has a reading board 16 thereon with an upturned front ledge 17 which abuts ledge 14 of the shelf.

Reading board 16 serves to hold reading material such as advertising brochures 20 and other literature relating to the shingles. Each shingle sample board 15, as shown in FIG. 3, is provided adjacent its upper end with an oval cut out 21 to form a handle. The board is covered with a layer of overlapping shingles 22 in a particular color or color blend. By way of example, we shall assume that the showroom in which the rack is installed has in stock shingle sample boards in six different color blends—charcoal, redwood, slate, heather, cedar and weathered wood, and that these six sample boards are placed on the rack shelves. Because the shelves are tilted, all of the sample boards can be viewed by the homeowner. But if he wishes to separately examine a sample board or to take one home, he may remove it from its shelf and carry it by the handle.

As seen in FIG. 4, the front panel 23 of the color selector box 19 is provided at its central region with a radial array of five pictures $P_1$, $P_2$, $P_3$, $P_4$, and $P_5$. Each picture shows a typical home in a distinctive architectural style: Cape Cod, Tudor, contemporary, etc., the home pictures radiating from a center hub. In lieu of pictures, one may use drawings of the typical homes.

In each picture of a home, the roof thereof is notched out. This is shown separately in FIG. 5, where it will be seen that the roof of a pictured home $P_4$ is excised to create a roof window $W_4$ whose geometry matches that of the actual roof. Thus each of the pictured homes $P_1$ to $P_5$ has a correspondingly-numbered roof window, the geometry of which depends on the roof configuration for the particular house shown.

Box 19 is provided with a rear wall 24, as shown in FIG. 7, on which is mounted a bank of bulbs 25 to back illuminate a rotatable color wheel 26. This wheel is mounted behind the front panel 23 on an axle 27 which goes through the center X of the radial array of pictures in the front panel. The diameter of wheel 26 and its position relative to the front panel is such that the peripheral edge of the wheel extends below the front panel through a slot in the bottom of the box to provide a dial 26D.

Color wheel 26 is constituted by a disc of transparent plastic material such as acrylic, as shown in FIG. 6. The wheel is effectively divided into six color segments SA, SB, SD, SD, SE and SF. Each segment is covered with a photo transparency film which provides a shingled surface whose color matches that of a respective shingle sample board. This one segment surface is a charcoal blend, another is a redwood blend, and so on, so that each of the six shingle sample boards has a correspondingly colored segment on the wheel. Alternatively, instead of transparencies, one may use for the segments positive prints of the colored shingles and front illuminate the color selector.

The relationship of the segments to the roof windows on the front panel is such that each window, when aligned with a particular segment, will then appear to have a shingled roof of the type provided by the segment, the pictured roof being illuminated.

In order for a homeowner to receive a visual impression of what any one of the colored shingle samples would look like when the roof of his home is covered by shingles of this color, the homeowner picks out for inspection from the array of pictured typical homes on the panel, the one whose style is similar to that of his own home. He then, while looking at the roof window in the pictured home he has selected for inspection, manually operates dial 26D to turn the color wheel so that each of the segments SA to SF is successively brought in alignment with the roof window.

In this way the homeowner may first look at the sample boards on the rack and tentatively select the color he likes best. He can then see the impression made by this color when the roof in a pictured home in a style similar to his home has its roof in this color. If the homeowner is disappointed in this effect, he can then try other colors until he makes up his mind as to which color is most effective on the roof of the pictured home.

The cost of reshingling a roof is not low, and a homeowner is not usually disposed to make a quick decision as to his choice of shingles. But since a sample board can easily be removed from the rack, the homeowner can, if necessary, take the sample board home and consider his choice more carefully.

The color selector box need not be mounted on the rack, but may be placed on a counter next to the rack, thereby providing more space in the rack for shelves. And the arrangement may be such as to provide a spindle for the color wheel so that one can place on this spindle whatever color wheel is appropriate to the shingle colors which are available in the showroom. If, for example, eighteen different shingle colors are available, a single color wheel is not capable of carrying this number of segments.

While there has been shown and described a preferred embodiment of Display Rack and Color Selector Assembly in accordance with the invention, it will be appreciated that many changes and modifications may be made therein without, however, departing from the essential spirit thereof. Thus, instead of a manually operated color wheel, the wheel may be indexed from segment to segment by a stepping motor which is push-button operated.

We claim:

1. A display rack and color selector assembly comprising:
    A. a rack having shelves on which are supported removable sample boards carrying roof shingles in different colors; and
    B. a color selector including a front panel on whose face is a radial array of typical homes in different architectural styles, the roof in each picture being notched out to define a window whose geometry matches that of the roof, and a rotatable color wheel mounted behind the panel, the wheel being divided into segments, each having a shingled surface whose color corresponds to that of a respective sample, whereby a homeowner by inspecting a pictured home whose style is similar to that of his own, can then turn the color wheel to bring into registration with the roof window thereof, the segments of the wheel and thereby see how the pictured home looks when its roof is covered with shingles in any one of the different sample colors.

2. An assembly as set forth in claim 1, wherein said rack includes an upstanding rectangular frame having a pair of vertical side bars, and said shelves are supported between the vertical bars at different levels thereon at an angle thereto whereby the sample boards supported on the shelves are inclined so that all of the boards on the rack are viewable.

3. An assembly as set forth in claim 2, wherein said shelves are each formed by a continuous wire in a rectangular form whose front end is shaped to define a ledge to hold the sample board.

4. An assembly as set forth in claim 1, wherein the bars of said upstanding frame are joined to a rear easel support.

5. An assembly as set forth in claim 1, wherein said sample boards each include an oval opening to define a handle therefor.

6. An assembly as set forth in claim 2, wherein said color selector is in box form and is supported at the upper end of the rack between the bars.

7. An assembly as set forth in claim 6, wherein said color wheel is formed by a transparent disc to which are applied color transparency segments, each having a representation of a shingled surface in a distinct color.

8. An assembly as set forth in claim 7, wherein said box includes a light source to back illuminate the color wheel.

9. An assembly as set forth in claim 1, in which the rack includes at least five inclined shelves at different levels.

* * * * *